US009569145B2

(12) United States Patent
Uchida et al.

(10) Patent No.: US 9,569,145 B2
(45) Date of Patent: Feb. 14, 2017

(54) GATEWAY APPARATUS

(71) Applicant: KONICA MINOLTA, INC., Tokyo (JP)

(72) Inventors: Hisashi Uchida, Kyoto (JP); Kazumi Sawayanagi, Itami (JP); Masami Yamada, Osaka (JP); Kazuya Anezaki, Itami (JP); Akihiro Torigoshi, Itami (JP); Yasutaka Ito, Amagasaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 175 days.

(21) Appl. No.: 14/633,212

(22) Filed: Feb. 27, 2015

(65) Prior Publication Data

US 2015/0261273 A1 Sep. 17, 2015

(30) Foreign Application Priority Data

Mar. 12, 2014 (JP) ................................ 2014-048438

(51) Int. Cl.

| G06F 11/00 | (2006.01) |
|---|---|
| G06F 3/12 | (2006.01) |
| G06F 1/28 | (2006.01) |
| G06F 1/30 | (2006.01) |
| G06F 1/32 | (2006.01) |

(52) U.S. Cl.
CPC . *G06F 3/12* (2013.01); *G06F 1/28* (2013.01); *G06F 1/30* (2013.01); *G06F 1/3293* (2013.01); *Y02B 60/121* (2013.01)

(58) Field of Classification Search
CPC ................ G06F 3/12; G06F 1/28; G06F 1/30; G06F 1/3293
See application file for complete search history.

(56) References Cited

U.S. PATENT DOCUMENTS

| 8,625,488 | B1 * | 1/2014 | Gogate ................. H04W 88/08 370/315 |
|---|---|---|---|
| 2008/0071972 | A1 | 3/2008 | Kimura |
| 2011/0090883 | A1 * | 4/2011 | Tanaka .................. G06F 1/3203 370/338 |

(Continued)

FOREIGN PATENT DOCUMENTS

JP 2008-210358 A 9/2008

*Primary Examiner* — Philip Guyton
(74) *Attorney, Agent, or Firm* — Buchanan Ingersoll & Rooney PC (57) ABSTRACT

A gateway apparatus connected to an image processing apparatus in a communicable manner and connected to an external apparatus via a network, and performing communication control between the image processing apparatus and the external apparatus, includes: a main CPU; a sub CPU; a first detecting unit configured to detect a state of a primary power supply; a second detecting unit configured to detect a state of a secondary power supply; a generating unit configured to generate a transfer instruction message; an acquiring unit configured to acquire information about a change in a state of the gateway apparatus or an apparatus located in the vicinity of the gateway apparatus; an updating unit configured to repeatedly perform updating of the transfer instruction message; and a transmitting unit configured to transmit the last-generated or last-updated transfer instruction message to an external alternate apparatus.

11 Claims, 8 Drawing Sheets

(56) References Cited

U.S. PATENT DOCUMENTS

| | | | |
|---|---|---|---|
| 2012/0047375 A1* | 2/2012 | Hashimoto | G06F 1/263 |
| | | | 713/300 |
| 2014/0175879 A1* | 6/2014 | Choo | H04L 12/6418 |
| | | | 307/29 |
| 2016/0150112 A1* | 5/2016 | Anezaki | H04N 1/00891 |
| | | | 358/1.13 |

* cited by examiner

TRANSFER PRIORITY TABLE (IN MAIN MEMORY)

| PRIORITY | DEVICE NAME | IP ADDRESS |
|---|---|---|
| 1 | ALTERNATE GATEWAY APPARATUS A | xx.xx.xx.xx |
| 2 | ALTERNATE GATEWAY APPARATUS B | xx.xx.xx.xx |
| 3 | ALTERNATE GATEWAY APPARATUS C | xx.xx.xx.xx |

GATEWAY APPARATUS

The entire disclosure of Japanese Patent Application No. 2014-048438 filed on Mar. 12, 2014 including description, claims, drawings, and abstract are incorporated herein by reference in its entirety.

BACKGROUND OF THE INVENTION

Field of the Invention

The present invention relates to gateway apparatuses, and more particularly, to a gateway apparatus that can control communication between an image processing apparatus connected to the gateway apparatus and an external apparatus.

Description of the Related Art

Instead of server software that is operated by a server so as to reduce the server introduction/management costs in a LAN (Local Area Network), so-called cloud applications are now widely spread. When executed with the use of a so-called cloud server connected to the Internet, a cloud application can provide various kinds of services to a user.

In some cloud system that provides a cloud application in a usable form, the cloud application provides various kinds of services while communicating with devices such as MFPs (Multi-Function Peripherals) or printers that are operated in a LAN in each corporation. In such a cloud system, communication from the cloud application to a device is conducted. This communication is to access an MFP or the like in an intranet from the Internet. Therefore, due to the function of a so-called firewall normally located on a boundary between the Internet and an intranet, communication cannot be conducted in some cases. In an environment where private IP addresses are allocated to MFPs, for example, the IP address of an MFP cannot be designated from the cloud application side, and communication cannot be conducted. In view of this, a gateway apparatus that relays communication between an apparatus on the Internet side and a device in a LAN is used.

A gateway apparatus is constantly connected to a management server that can be connected thereto via the Internet, and relayed communication between an apparatus such as a cloud server on the Internet side and an image processing apparatus in a LAN can be established based on a result of communication with the management server.

The power supply for such a gateway apparatus is sometimes cut off due to a maintenance activity or the like. In view of this, an alternate apparatus having an alternate function of a gateway apparatus is prepared beforehand. When the power supply is cut off, the function is transferred from the gateway apparatus to the alternate apparatus, so that relayed communication between an apparatus on the Internet side and a device in a LAN can be conducted via the alternate apparatus.

JP 2008-210358 A discloses a method by which the data necessary for an electronic circuit unit to recover is saved in a nonvolatile memory in a data processing apparatus after a cutoff of the primary power supply is detected as a trigger, until the voltage of the secondary power supply drops to the lower limit of the operation-guarantee voltage of the apparatus.

In some cases, a power supply for a gateway apparatus is unexpectedly cut off. For example, when a problem occurs in a gateway apparatus, a user might inadvertently switch off the power supply for the gateway apparatus, or an accidental power failure might occur. So as to maintain relayed communication in such a case, the function needs to be transferred to an alternate apparatus before the voltage of the secondary power supply becomes lower than the operation-guarantee voltage of the CPU, with a cutoff of the primary power supply being a trigger.

The period from a cutoff of the primary power supply to a drop of the voltage of the secondary power supply depends on power consumption in the gateway apparatus. Therefore, to complete a function transfer without fail, the processing to be performed in the gateway apparatus needs to be minimized. To minimize the processing, the method described below may be employed, for example.

In some cases, a gateway apparatus has both a main CPU and a sub CPU. A CPU that has a relatively high information processing capacity but has a relatively high lower limit of the operation-guarantee voltage may be used as the main CPU, and a CPU that has a relatively low information processing capacity but has a relatively low lower limit of the operation-guarantee voltage may be used as the sub CPU. In this case, the sub CPU can be made to perform the transfer operation.

As the alternate apparatus that serves as the transfer destination is determined beforehand, the information necessary for the transfer can be sent beforehand. Here, the necessary information for the transfer includes a list of devices such as image processing apparatuses to be managed by the gateway apparatus in such a manner that relayed communication can be conducted, the IP address of the management server, and the like.

However, such a method has the problems described below.

Specifically, the alternate apparatus might be unable to transfer the function, because the power supply for the alternate apparatus is off, or normal communication cannot be conducted due to a network failure, for example. The method by which the alternate apparatus that is to serve as the transfer destination is determined in advance cannot cope with such situations.

Also, in a case where only a transfer instruction is sent to the alternate apparatus, the communication being relayed at the moment is discarded. Therefore, if a transfer instruction is issued while printing is being performed based on information transmitted from a cloud server, for example, the print job being performed is discarded, and the printing needs to be resumed from the top of the job.

To solve the former problem, it is possible to employ a method by which a device that is suitable for the transfer is selected from among alternate apparatuses while the state of each alternate apparatus that can serve as a transfer destination is checked. By such a method, however, the load on the main CPU becomes larger, and the processing requires a longer period of time. Therefore, the voltage might run out during the processing, and the transfer process might not be performed.

To solve the latter problem, it is possible to employ a method by which a function transfer is performed after the relaying of the communication being relayed is completed. However, the voltage might run out before the relaying is completed, and the transfer process might not be performed.

SUMMARY OF THE INVENTION

The present invention has been developed to solve the above problems, and an object thereof is to provide a gateway apparatus that has a high possibility of succeeding in transferring a function to an alternate apparatus when the primary power supply is cut off.

To achieve the abovementioned object, according to an aspect, a gateway apparatus that is connected to an image processing apparatus in a communicable manner, is connected to an external apparatus via a network, and performs communication control between the image processing apparatus and the external apparatus, reflecting one aspect of the present invention comprises: a main CPU that performs the communication control; a sub CPU that is capable of operating at a lower voltage than the main CPU; a first detecting unit that detects a state of a primary power supply; a second detecting unit that detects a state of a secondary power supply; a generating unit that, under the control of the main CPU, generates a transfer instruction message in accordance with a result of the detection performed by the first detecting unit; an acquiring unit that, under the control of the main CPU, acquires information about a change in a state of the gateway apparatus or an apparatus located in the vicinity of the gateway apparatus; an updating unit that, under the control of the main CPU, repeatedly performs updating of the transfer instruction message generated by the generating unit in accordance with the information acquired by the acquiring unit, after the generation of the transfer instruction message; and a transmitting unit that, under the control of the sub CPU, transmits the last-generated or last-updated transfer instruction message to an external alternate apparatus having a function to perform the communication control, in accordance with a result of the detection performed by the second detecting unit.

The first detecting unit preferably determines whether the primary power supply for the gateway apparatus has been cut off, and the generating unit preferably starts generating the transfer instruction message after a power supply for the gateway apparatus is cut off.

The second detecting unit preferably determines whether the voltage of the secondary power supply has dropped to the lower limit of the operation-guarantee voltage of the main CPU, and, after the voltage of the secondary power supply has dropped to the lower limit of the operation-guarantee voltage of the main CPU, the transmitting unit transmits the transfer instruction message at that point.

The acquiring unit preferably acquires information about the state of the alternate apparatus, and the updating unit preferably repeatedly performs the updating in accordance with the information about the state of the alternate apparatus .

The gateway apparatus preferably further includes a selecting unit that, under the control of the main CPU, selects one alternate apparatus from among apparatuses each being able to serve as the alternate apparatus. The generating unit generates the transfer instruction message so as to cope with the alternate apparatus selected by the selecting unit not based on the state of any of the apparatuses. The updating unit updates the transfer instruction message so as to cope with the alternate apparatus selected by the selecting unit based on the state of at least one of the apparatuses.

The gateway apparatus preferably further includes a relaying unit that relays communication between the image processing apparatus and the external apparatus, and the communication control is performed by the relaying unit.

The gateway apparatus preferably further includes: a constant connection unit that is constantly connected to an external management apparatus; and a receiving unit that receives a connection request from the management apparatus. In response to the connection request, the relaying unit establishes a session connecting the external apparatus and the image processing apparatus, and relays the communication between the external apparatus and the image processing apparatus.

While the relaying unit is relaying relay data, the generating unit preferably generates the transfer instruction message including identification information indicating to what extent the relaying of the relay data has been completed, and, when performing the updating, the updating unit preferably updates the transfer instruction message including the identification information in accordance with the completion status of the relaying of the relay data obtained until then.

The sub CPU is preferably activated when the main CPU enters a sleep state, and is preferably activated when the primary power supply is cut off in accordance with a result of the detection performed by the first detecting unit.

To achieve the abovementioned object, according to an aspect, a method of controlling a gateway apparatus that is connected to an image processing apparatus in a communicable manner, is connected to an external apparatus via a network, and performs communication control between the image processing apparatus and the external apparatus, the gateway apparatus including: a main CPU that can perform the communication control; a sub CPU that can operate at a lower voltage than the main CPU; a first detecting unit that detects the state of a primary power supply; and a second detecting unit that detects the state of a secondary power supply, the method reflecting one aspect of the present invention comprises: a generating step of, under the control of the main CPU, generating a transfer instruction message in accordance with a result of the detection performed by the first detecting unit; an acquiring step of, under the control of the main CPU, acquiring information about a change in the state of the gateway apparatus or an apparatus located in the vicinity of the gateway apparatus; an updating step of, under the control of the main CPU, repeatedly performing updating of the transfer instruction message generated in the generating step in accordance with the information acquired in the acquiring step, after the generation of the transfer instruction message; and a transmitting step of, under the control of the sub CPU, transmitting the last-generated or last-updated transfer instruction message to an external alternate apparatus having a function to perform the communication control, in accordance with a result of the detection performed by the second detecting unit.

To achieve the abovementioned object, according to an aspect, a non-transitory recording medium storing a computer readable program for controlling a gateway apparatus that is connected to an image processing apparatus in a communicable manner, is connected to an external apparatus via a network, and performs communication control between the image processing apparatus and the external apparatus, the gateway apparatus including: a main CPU that can perform the communication control; a sub CPU that can operate at a lower voltage than the main CPU; a first detecting unit that detects the state of a primary power supply; and a second detecting unit that detects the state of a secondary power supply, the program reflecting one aspect of the present invention causes a computer to carry out: a generating step of, under the control of the main CPU, generating a transfer instruction message in accordance with a result of the detection performed by the first detecting unit; an acquiring step of, under the control of the main CPU, acquiring information about a change in the state of the gateway apparatus or an apparatus located in the vicinity of the gateway apparatus; an updating step of, under the control of the main CPU, repeatedly performing updating of the transfer instruction message generated in the generating step in accordance with the information acquired in the acquiring step, after the generation of the transfer instruction message; and a transmitting step of, under the control of the sub CPU, transmitting the last-generated or last-updated transfer instruction message to an external alternate apparatus having a function to perform the communication control, in accordance with a result of the detection performed by the second detecting unit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

The following is a description of an example of an image forming system that uses a gateway apparatus according to an embodiment of the present invention.

The image forming system utilizes a so-called cloud computing technology. For example, an output from an image forming apparatus in an intranet located in a predetermined LAN (local area network) or the like can be transmitted from an external terminal via the Internet. Also, information obtained by an image forming apparatus in an intranet, for example, can be acquired or viewed with an external terminal via the Internet. On the Internet side, a cloud server that provides such services and a management server that manages the information for connecting the cloud server and the intranet are provided. On the intranet side, a gateway apparatus that performs a relay function for communication with the Internet is provided.

On the intranet side of the image forming system, an alternate apparatus for the gateway apparatus is provided. In place of the gateway apparatus, the alternate apparatus can perform a relay function when the gateway apparatus is unable to operate.

In this embodiment, image forming apparatuses that function as the gateway apparatus and alternate apparatuses for the gateway apparatus, and image forming apparatuses that function as image processing apparatuses that communicate with the cloud server may be monochrome/color copying machines, printers, or facsimile machines, for example. Alternatively, these image forming apparatuses may be MFPs (Multi-Function Peripherals) each having a scan function, a copy function, a function of a printer, a facsimile function, a data communication function, and a server function. The scan function is a function to read an image from an original and store the image into a HDD (Hard Disk Drive) or the like. The copy function is a function to print the image onto a paper sheet or the like. The function of a printer is a function to perform printing on a paper sheet in accordance with a print instruction received from an external terminal such as a PC. The facsimile function is a function to receive facsimile data from an external facsimile machine or the like and store the facsimile data into the HDD or the like. The data communication function is a function to transmit and receive data to and from a connected external device. The server function is a function to enable users to share the data stored in the HDD or the like.

EMBODIMENTS

Figure 1:
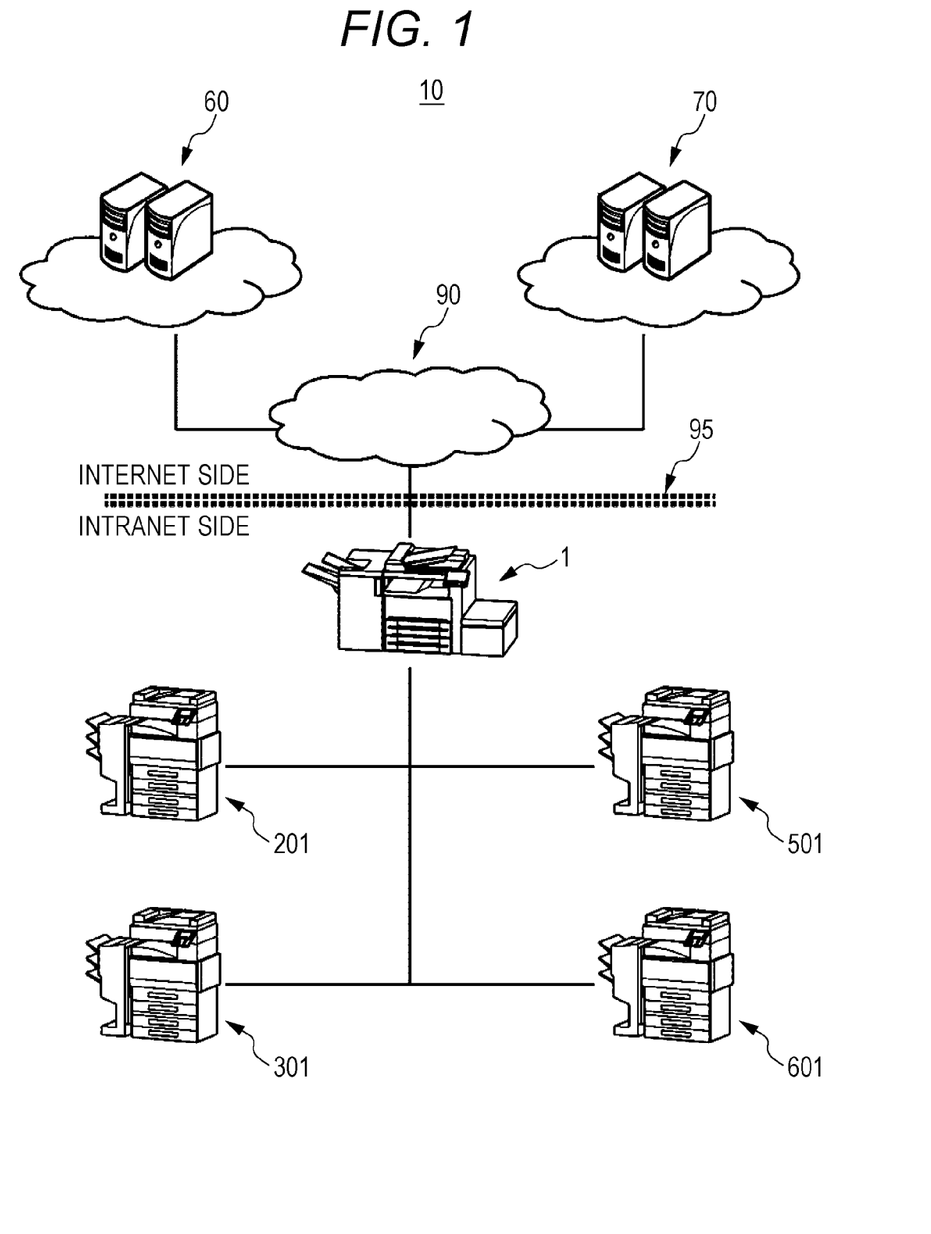
FIG. 1 is a diagram showing the configuration of an image forming system according to an embodiment of the present invention.

FIG. 1 is a diagram showing the configuration of an image forming system according to an embodiment of the present invention.

As shown in FIG. 1, the image forming system 10 is roughly divided into a group of apparatuses located on the Internet (an example network) side and a group of apparatuses located on the intranet side.

On the Internet side of the image forming system 10, a cloud server (an example of the external apparatus) 60 and a management server (an example of the management apparatus) 70 are provided. The cloud server 60 and the management server 70 can communicate with each other through the Internet 90.

The configuration including the cloud server 60, the management server 70, and the like is merely an example of a cloud system abstractly shown in terms of the respective functions, and, in reality, there are various kinds of specific configurations that realize such functions.

On the intranet side of the image forming system 10, a gateway apparatus 1, two alternate gateway apparatuses (hereinafter also referred to simply as alternate apparatuses) 201 and 301, and two devices (examples of the image processing apparatus) 501 and 601 are provided. The gateway apparatus 1, the alternate apparatuses 201 and 301, and the devices 501 and 601 are connected to one another by a LAN, and constitute an intranet. The gateway apparatus 1 is connected to the Internet 90 via a so-called firewall 95. The alternate apparatuses 201 and 301 and the devices 501 and 601 can access apparatuses in the Internet via the gateway apparatus 1.

Figure 2:
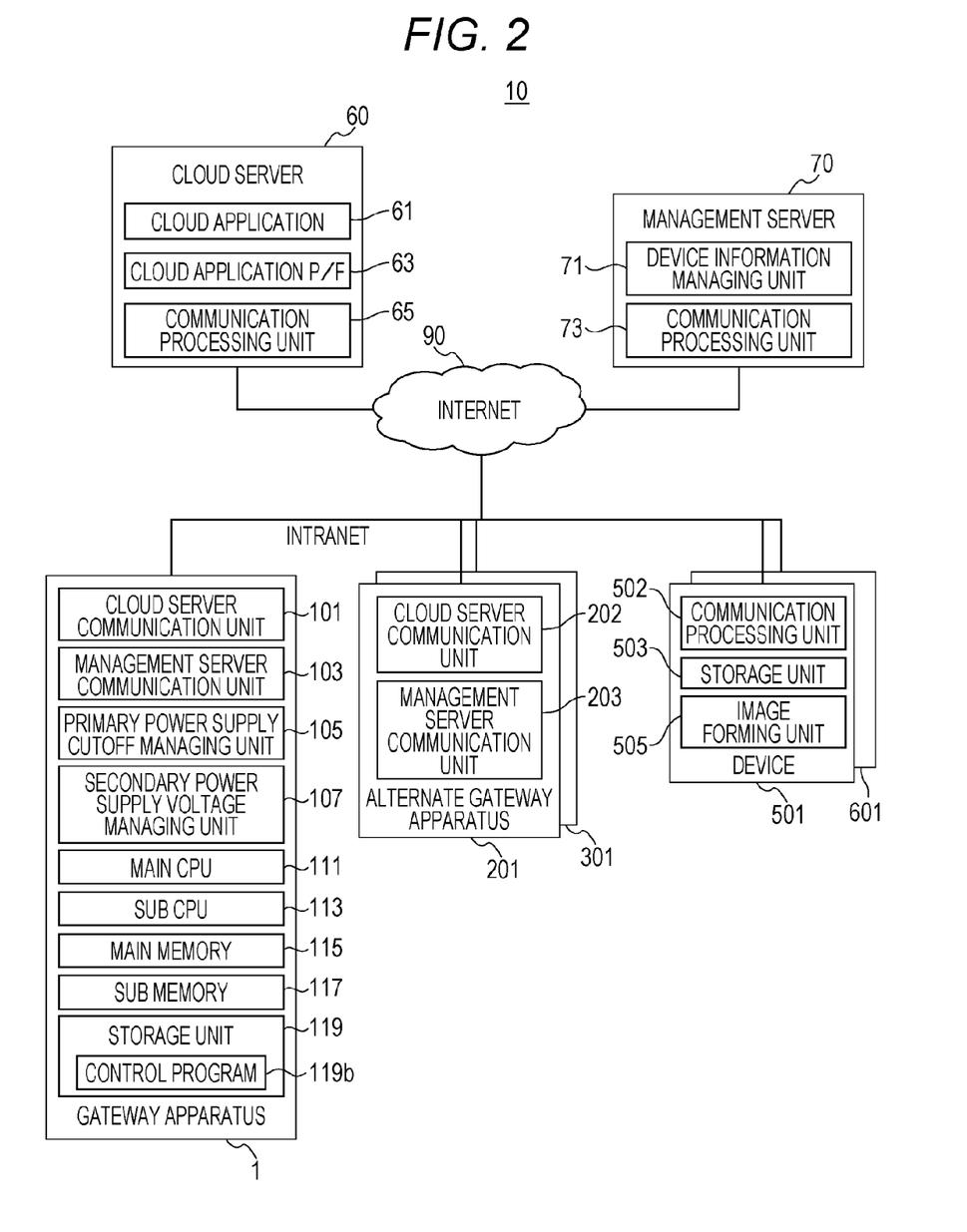
FIG. 2 is a block diagram showing the image forming system.

FIG. 2 is a block diagram showing the configuration of the image forming system 10.

As shown in FIG. 2, the cloud server 60 includes a communication processing unit 65, and can communicate with an external device via the Internet 90. The cloud server 60 executes a cloud application 61 on a cloud application platform (cloud application P/F) 63, to perform various control operations.

The management server 70 includes a device information managing unit 71 and a communication processing unit 73. By virtue of the communication processing unit 73, the management server 70 can communicate with an external device via the Internet 90. The management server 70 is constantly connected to the gateway apparatus 1, and the device information managing unit 71 manages information about devices including the devices 501 and 601 on the intranet side, with which the cloud server 60 is to communicate. A device that is to communicate with devices including the devices 501 and 601 can communicate with these devices based on the information being managed by the management server 70.

The devices 501 and 601 are MFPs having the same structures as each other. The device 501 includes a communication processing unit 502, a storage unit 503, an image forming unit 505, and the like. The communication processing unit 502 performs control on communication between the device 501 and the cloud server 60 or the like. The storage unit 503 stores the data of images formed by the image forming unit 505, data to be used in operations, and the like.

The gateway apparatus 1 is an MFP, for example. The gateway apparatus 1 includes a cloud server communication unit 101, a management server communication unit 103, a primary power supply cutoff managing unit (an example of the first detecting unit) 105, and a secondary power supply voltage managing unit (an example of the second detecting unit) 107, as well as the respective components necessary to function as an MFP. The gateway apparatus 1 also includes a main CPU 111, a sub CPU 113, a main memory 115, a sub memory 117, a storage unit 119, and the like. Under the control of the main CPU 111, the gateway apparatus 1 communicates with the cloud server 60 or controls communication between the cloud server 60 and the device 501 or the like based on an operation performed by the cloud server communication unit 101. Under the control of the main CPU 111, the gateway apparatus 1 also communicates with the management server 70 based on an operation performed by the management server communication unit 103. By doing so, the gateway apparatus 1 can relay communication between the cloud server 60 and the device 501 or the like (the relay function).

The primary power supply cutoff managing unit 105 detects a status of a primary power supply for the gateway apparatus 1. Specifically, the gateway apparatus 1 determines whether the primary power supply for the gateway apparatus 1 has been cut off. The gateway apparatus 1 is driven by a power supply from a commercial power source, for example. When there is a failure in the commercial power source, for example, the primary power supply cutoff managing unit 105 detects a cutoff of the primary power supply. When the power supply for the gateway apparatus 1 is switched off by a user, for example, the primary power supply cutoff managing unit 105 also detects a cutoff of the primary power supply.

The secondary power supply voltage managing unit 107 detects a status of a secondary power supply for the gateway apparatus 1. Specifically, the secondary power supply voltage managing unit 107 determines whether the voltage of the secondary power supply has dropped to the lower limit of the operation-guarantee voltage of the main CPU 111. The voltage of the secondary power supply gradually drops after the primary power supply is cut off. When the voltage of the secondary power supply drops to the predetermined lower limit of the operation-guarantee voltage, the secondary power supply voltage managing unit 107 detects the voltage drop.

In this embodiment, the main CPU 111 has a high information processing capacity, but the lower limit of the operation-guarantee voltage thereof is relatively high. The sub CPU 113 has a low information processing capacity, but the lower limit of the operation-guarantee voltage thereof is lower than that of the main CPU 111. The main CPU 111 performs communication control such as a relay function, when driven in a normal operation mode. The sub CPU 113 is activated when the main CPU 111 enters a sleep state. When driven in a power-saving mode that is a sleep state, the sub CPU 113, in place of the main CPU 111, controls the gateway apparatus 1. The main CPU 111 uses the main memory 115 to perform a control operation, and the sub CPU 113 uses the sub memory 117 to perform a control operation. The sub CPU 113 can operate at a lower voltage than the main CPU 111.

Various kinds of data to be used when the gateway apparatus 1 operates are stored in the storage unit 119. For example, a control program 119b is stored in the storage unit 119. As the main CPU 111 and the sub CPU 113 operate based on the control program 119b, the gateway apparatus 1 performs various operations.

The alternate apparatuses 201 and 301 have the same structures as each other. The alternate apparatus 201 is an MFP, for example. The alternate apparatus 201 includes a cloud server communication unit 202 and a management server communication unit 203, as well as the respective components necessary to function as an MFP. The cloud server communication unit 202 functions in the same manner as the cloud server communication unit 101. The management server communication unit 203 functions in the same manner as the management server communication unit 103. That is, in place of the gateway apparatus 1, each of the alternate apparatuses 201 and 301 can perform a relay function. In this embodiment, when a transfer instruction message is transmitted from the gateway apparatus 1, the alternate apparatuses 201 and 301 can perform such a relay function in accordance with the message, in place of the gateway apparatus 1.

Description of Relayed Communication Via the Gateway Apparatus 1

Next, relayed communication to be performed via the gateway apparatus 1 is described. In a case where communication is to be performed between the cloud server 60 and the device 501, for example, the gateway apparatus 1 performs communication control in the manner described below, and relays the communication between the cloud server 60 and the device 501. As a result, communication can be performed between the cloud server 60 and the device 501.

Figure 3:
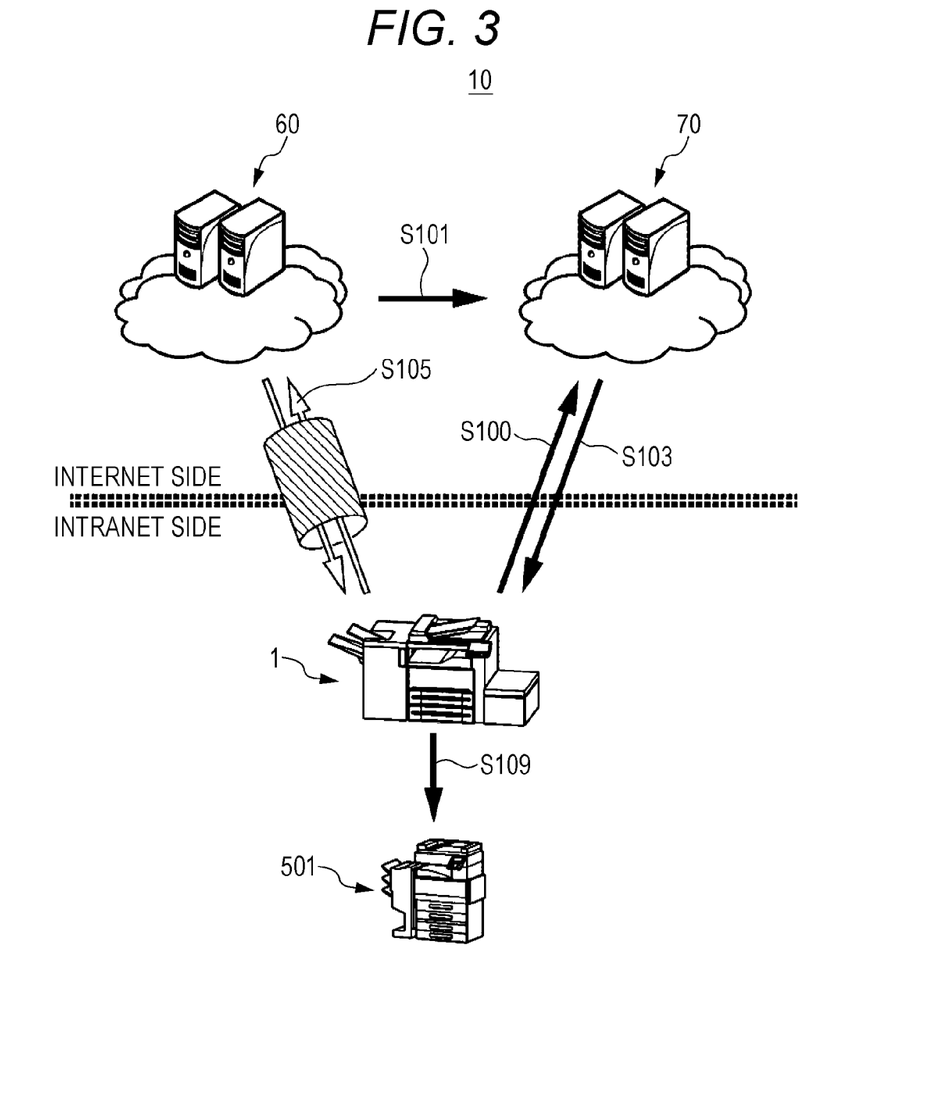
FIG. 3 is a diagram for explaining a relay function to be performed by a gateway apparatus.

FIG. 3 is a diagram for explaining the relay function to be performed by the gateway apparatus 1.

As shown in FIG. 3, in the image forming system 10, the gateway apparatus 1 in step S100 generates a message session with the management server 70 mainly at a time of its activation. At the same time, the gateway apparatus 1 also transmits the identification information about the devices 501 and 601 that can be connected to the gateway apparatus 1, to the management server 70. The message session is generated in a protocol such as XMPP (Extensible Messaging and Presence Protocol). After the message session is generated, a constant connection state is maintained, and therefore, a keep-alive (keepalive) packet is repeatedly transmitted at reasonable intervals.

In step S101, the cloud application 61 of the cloud server 60 requests a connection from the management server 70, so as to communicate with the device 501.

In step S103, the management server 70 transmits a tunnel connection request to the gateway apparatus 1 through the message session.

In step S105, upon receipt of the tunnel connection request, the gateway apparatus 1 establishes an HTTP session to connect the cloud server 60 and the device 501 in accordance with the tunnel connection request. The gateway apparatus 1 relays communication between the cloud server 60 and the device 501 via the HTTP session established in the above manner. That is, the cloud application 61 can transmit data, using this HTTP session as a tunnel.

In step S109, the gateway apparatus 1 transmits the data received from the cloud application 61 to the device 501. The gateway apparatus 1 also transmits data received from the device 501 to the cloud application 61. In this manner, relayed communication using the relay function performed by the gateway apparatus 1 is performed between the cloud server 60 being operated by the cloud application 61 and the device 501.

Such communication is performed in a case where a terminal (not shown) connected to the Internet 90 uses the cloud application 61 provided by the cloud server 60, to designate the device 501 and output an image, for example. More specifically, an output is generated with the use of the device 501 based on document data held by a terminal, for example. In this case, the document data and an instruction to output the document data with the use of the device 501 are transmitted from the terminal to the cloud application 61. As a result, the cloud application 61 operates in the above described manner, relayed communication between the cloud server 60 and the device 501 is established by virtue of the relay function of the gateway apparatus 1, and the document data and an output instruction are transmitted from the cloud server 60 to the device 501. When the output is completed, information to that effect is transmitted from the device 501 to the cloud server 60, and the cloud application 61 notifies the terminal of the completion of the output. In this manner, the terminal can generate an output using the device 501 through the cloud application 61.

Relay Function Transfer Process

When the power supply for the gateway apparatus 1 is cut off in the image forming system 10, the relay function is transferred in the manner described below, and relayed communication is continued. As a relay function transfer process is performed, the relay function is performed by the alternate apparatus 201 or 301 while the gateway apparatus 1 is unable to perform the relay function. Accordingly, even if the power supply for the gateway apparatus 1 is cut off due to a maintenance activity or the like, or even if the power supply is cut off due to careless use of the gateway apparatus 1 by a user, relayed communication in the image forming system 10 is continued.

In this embodiment, the relay function is transferred to one apparatus selected as a transfer destination between the alternate apparatuses 201 and 301. A transfer destination is selected based on a transfer priority table stored in the main memory 115, for example.

Figure 4:
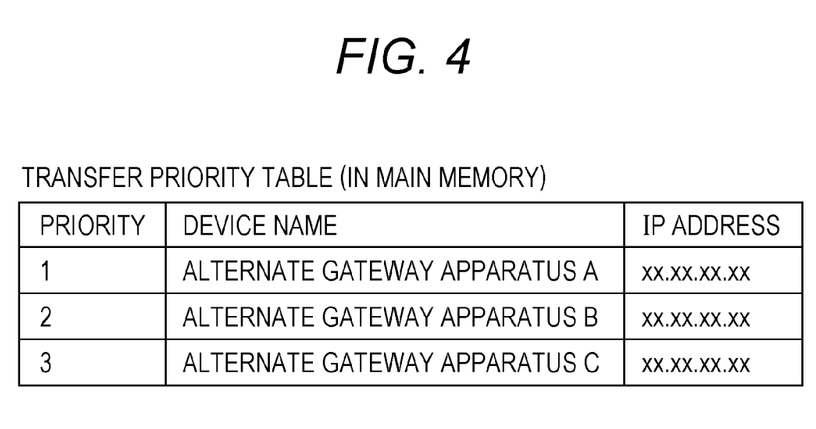
FIG. 4 is a diagram showing an example of a transfer priority table.

FIG. 4 is a diagram showing an example of the transfer priority table.

FIG. 4 shows the transfer priority table to be used in a case where there are three alternate apparatuses (an alternate gateway apparatus A, an alternate gateway apparatus B, and an alternate gateway apparatus C), for example. In the transfer priority table, the respective devices that can serve as alternate apparatuses are associated with IP addresses (private addresses), and are recorded in the descending order of priority of transfer destinations to be selected. By referring to the transfer priority table, the main CPU 111 selects an alternate apparatus as a transfer destination.

The transfer priority table may be set in advance, or may be generated based on a result of advance communication between the gateway apparatus 1 and apparatuses including the alternate apparatuses 201 and 301 in the intranet. Specifically, the priority of each of the alternate apparatuses 201 and 301 may be determined based on processing capacity information, response speed information, usage frequency information, and the like obtained by the gateway apparatus 1 through communication with apparatuses including the alternate apparatuses 201 and 301. The determined priority is then reflected in the transfer priority table.

Figure 5:
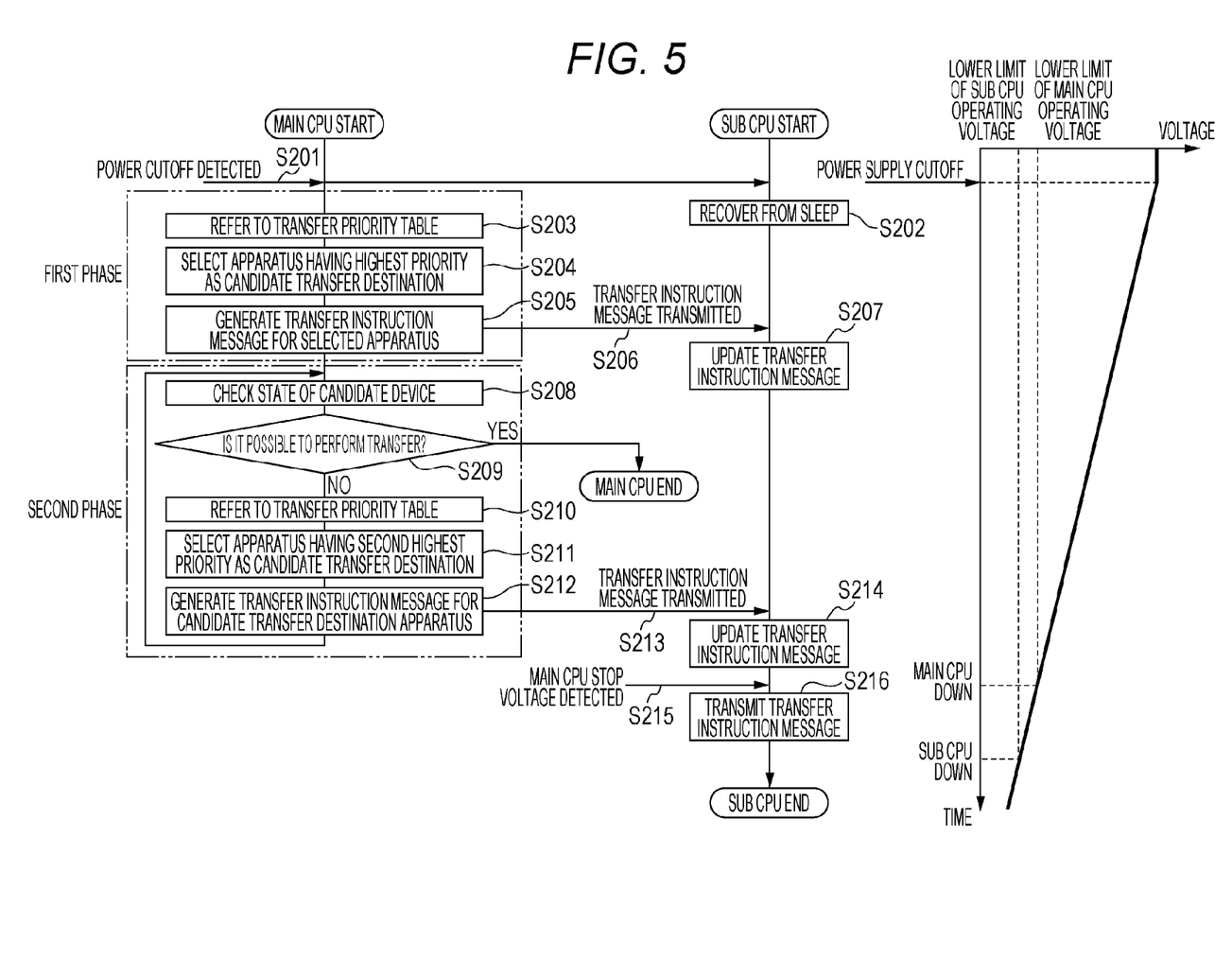
FIG. 5 is a diagram for explaining a relay function transfer operation.

FIG. 5 is a diagram for explaining the relay function transfer operation.

FIG. 5 shows, from left, the operation of the main CPU 111, the operation of the sub CPU 113, and the relationship between the secondary voltage of the gateway apparatus 1 and elapsed time.

As shown in FIG. 5, in step S201, a cutoff of the primary power supply is detected. After the primary power supply is cut off, the voltage of the secondary power supply gradually drops.

As a cutoff of the primary power supply is detected, the sub CPU 113 recovers from a sleep state in step S202. As a result, both the sub CPU 113 and the main CPU 111 are in operation.

After a cutoff of the primary power supply is detected, the main CPU 111 performs a first phase operation in steps S203 to S206, and a second phase operation in steps S208 to S213.

In the first phase in this embodiment, a transfer instruction message to be transmitted from the gateway apparatus 1 to the alternate apparatus 201 or 301, whichever is to be the transfer destination, is generated. Here, the alternate apparatus 201 or 301 is selected as the transfer destination based not on the states of the alternate apparatuses 201 and 301 but on the transfer priority table.

In step S203, the main CPU 111 refers to the transfer priority table.

In step S204, the main CPU 111 selects the apparatus with the highest priority in the transfer priority table, as a candidate transfer destination.

In step S205, the main CPU 111 generates a transfer instruction message for the selected alternate apparatus.

For example, in a case where the highest priority is set on the alternate apparatus 201 and the second highest priority is set on the alternate apparatus 301 in the transfer priority table, the alternate apparatus 201 is selected as a candidate transfer destination, regardless of the states of the alternate apparatuses 201 and 301, and a transfer instruction message for the alternate apparatus 201 is generated in the first phase.

In step S206, the main CPU 111 transmits the transfer instruction message generated in the first phase to the sub CPU 113.

In step S207, the sub CPU 113 updates the candidate transfer instruction message with the transmitted transfer instruction message.

After the transfer instruction message is generated in the first phase, and the transfer instruction message is transmitted to the sub CPU 113, the main CPU 111 performs the second phase operation. The second phase operation is continued until the alternate apparatus selected as the transfer destination is confirmed to be in such a state that the relay function can be transferred thereto, or the voltage of the secondary power supply drops to the lower limit of the operation-guarantee voltage of the main CPU 111.

In step S208, the main CPU 111 acquires information about changes in the states of the gateway apparatus 1 and the apparatuses in the vicinity of the gateway apparatus 1. In this embodiment, the state of the alternate apparatus selected as the candidate transfer destination is checked at this point. More specifically, the main CPU 111 acquires information about the power supply for the alternate apparatus and the operation mode of the alternate apparatus.

In step S209, the main CPU 111 determines whether the relay function can be transferred to the selected alternate apparatus. If the relay function can be transferred, the second phase operation comes to an end, and the operation of the main CPU 111 also ends.

If the relay function is determined not to be transferred in step S209, the main CPU 111 refers to the transfer priority table in step S210.

In step S211, the main CPU 111 selects the alternate apparatus with the second highest priority in the transfer priority table, as a candidate transfer destination. Specifically, in a case where the highest priority is set on the alternate apparatus 201, the second highest priority is set on the alternate apparatus 301, and the alternate apparatus 201 has already been selected, the alternate apparatus 301 is selected as a candidate transfer destination, instead of the alternate apparatus 201.

In step S212, the main CPU 111 generates a transfer instruction message for the alternate apparatus selected as a candidate transfer destination.

In step S213, the main CPU 111 transmits the transfer instruction message generated in the second phase to the sub CPU 113.

In step S214, the sub CPU 113 updates the candidate transfer instruction message with the transmitted transfer instruction message. In this manner, the sub CPU 113 can update the transfer instruction message generated by the main CPU 111 in the first phase with the transfer instruction message generated in the second phase.

After the transfer instruction message is transmitted in step S213, the main CPU 111 may determine whether the alternate apparatus selected as a candidate transfer destination is in such a state that the relay function can be transferred thereto, or repeat the processing in steps S208 to S213 until the voltage of the secondary power supply drops to the lower limit of the operation-guarantee voltage of the main CPU 111. Specifically, after the transfer instruction message is transmitted in step S213, the state of the alternate apparatus selected at the moment is checked, and, if the alternate apparatus is determined not to be in such a state that the relay function can be transmitted thereto, another alternate apparatus is selected as a candidate transfer destination based on the transfer priority table, and the transfer instruction message transmitted to the sub CPU 113 is updated. The selection and the update of the transfer instruction message are repeated until an alternate apparatus is determined to be in such a state that the relay function can be transferred thereto.

Here, the voltage of the secondary power supply is assumed to have dropped to the lower limit of the operation-guarantee voltage of the main CPU 111 in step S215. At this point, the secondary power supply voltage managing unit 107 detects the drop of the voltage of the secondary power supply to the lower limit of the operation-guarantee voltage, and the operation of the main CPU 111 comes to an end.

In step S216, the sub CPU 113 transmits the transfer instruction message in response to the detection by the secondary power supply voltage managing unit 107. The sub CPU 113 then transmits the transfer instruction message last generated or updated at that point, to the alternate apparatus selected at the time of the generation of the transfer instruction message. After the transmission, the operation of the sub CPU 113 comes to an end.

After the transfer instruction message is transmitted to the alternate apparatus in the above manner, the alternate apparatus performs the relay function in accordance with the received transfer instruction message.

Figure 6:
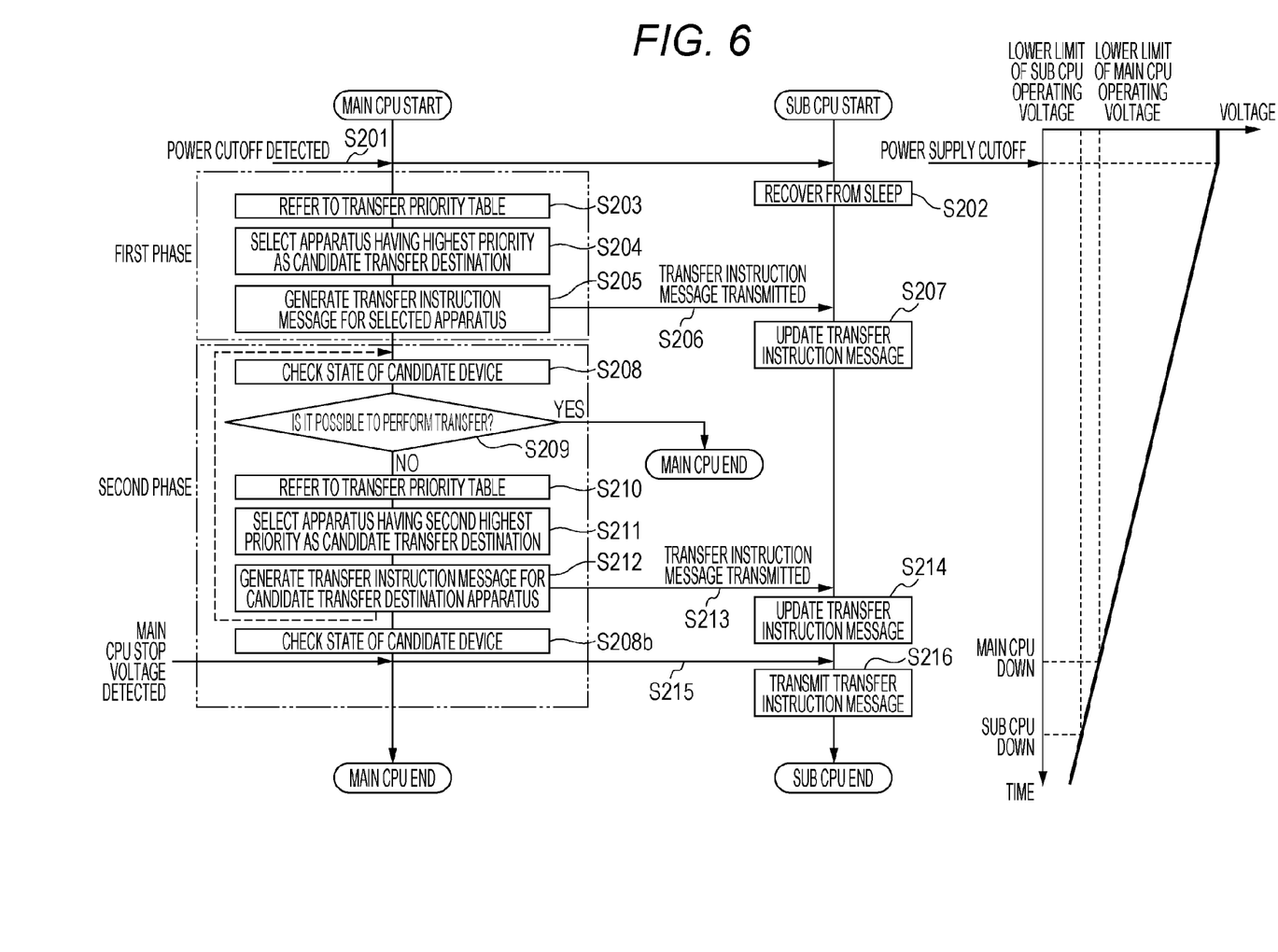
FIG. 6 is a diagram for explaining another example of a relay function transfer operation.

FIG. 6 is a diagram for explaining another example of the relay function transfer operation.

FIG. 6 shows an example case where the voltage of the secondary power supply drops to the lower limit of the operation-guarantee voltage of the main CPU 111 during the second phase operation. The processing in steps S201 to S216 in FIG. 6 is the same as the corresponding processing in FIG. 5.

In step S212 in FIG. 6, a transfer instruction message for update is generated by the main CPU 111. In step S213, the transfer instruction message is transmitted to the sub CPU 113. In step S208b, the state of the alternate apparatus selected as a candidate transfer destination at this point is checked. In step S215, if the secondary power supply voltage managing unit 107 detects a drop of the voltage of the secondary power supply to the lower limit of the operation-guarantee voltage of the main CPU 111 at this point, for example, the sub CPU 113 transmits the transfer instruction message.

As described above, in this embodiment, the primary power supply cutoff managing unit 105 detects a cutoff of the primary power supply, and triggers a start of a relay function transfer process. If the sub CPU 113 is in a sleep state, the sub CPU 113 recovers from the sleep state, and receives a transfer instruction message transmitted from the main CPU 111. While the voltage of the secondary power supply is maintained at such a voltage that the main CPU 111 can operate, the main CPU 111 repeatedly changes alternate apparatuses, updates the transfer instruction message, and checks the state of the selected alternate apparatus, until the selected alternate apparatus is confirmed to be in such a state that the relay function can be transferred thereto. In this manner, the relay function can be transferred to the alternate apparatus that has the highest priority among the alternate apparatuses to which the relay function can be transferred. Accordingly, the possibility that the relay function can be transferred to an alternate apparatus that is actually capable of performing the relay function becomes higher.

Meanwhile, when the voltage of the secondary power supply drops to the lower limit of the operation-guarantee voltage of the main CPU 111, the transfer instruction message is transmitted to the alternate apparatus selected as the candidate transfer destination, regardless of whether the relay function can be transferred to the alternate apparatus. Therefore, even if the voltage of the secondary power supply rapidly drops after the primary power supply is cut off, the transfer instruction message is transmitted without fail.

Accordingly, while the function transfer operation is performed without fail, the alternate apparatus that has the highest possible priority and is in such a state that the function can be transferred can be selected as the transfer destination. Thus, the usability of the image forming system 10 that performs relayed communication can be increased, without a sub power supply or data backup during normal operation.

Modifications

In the above described image forming system 10, the main CPU 111 may perform control so that the communication being relayed can be continued as long as possible even after a cutoff of the primary power supply is detected. Such an operation may be performed in place of the operation to select an appropriate transfer destination as in the above described embodiment, or may be performed in parallel with the select operation (or in conjunction with the select operation).

Figure 7:
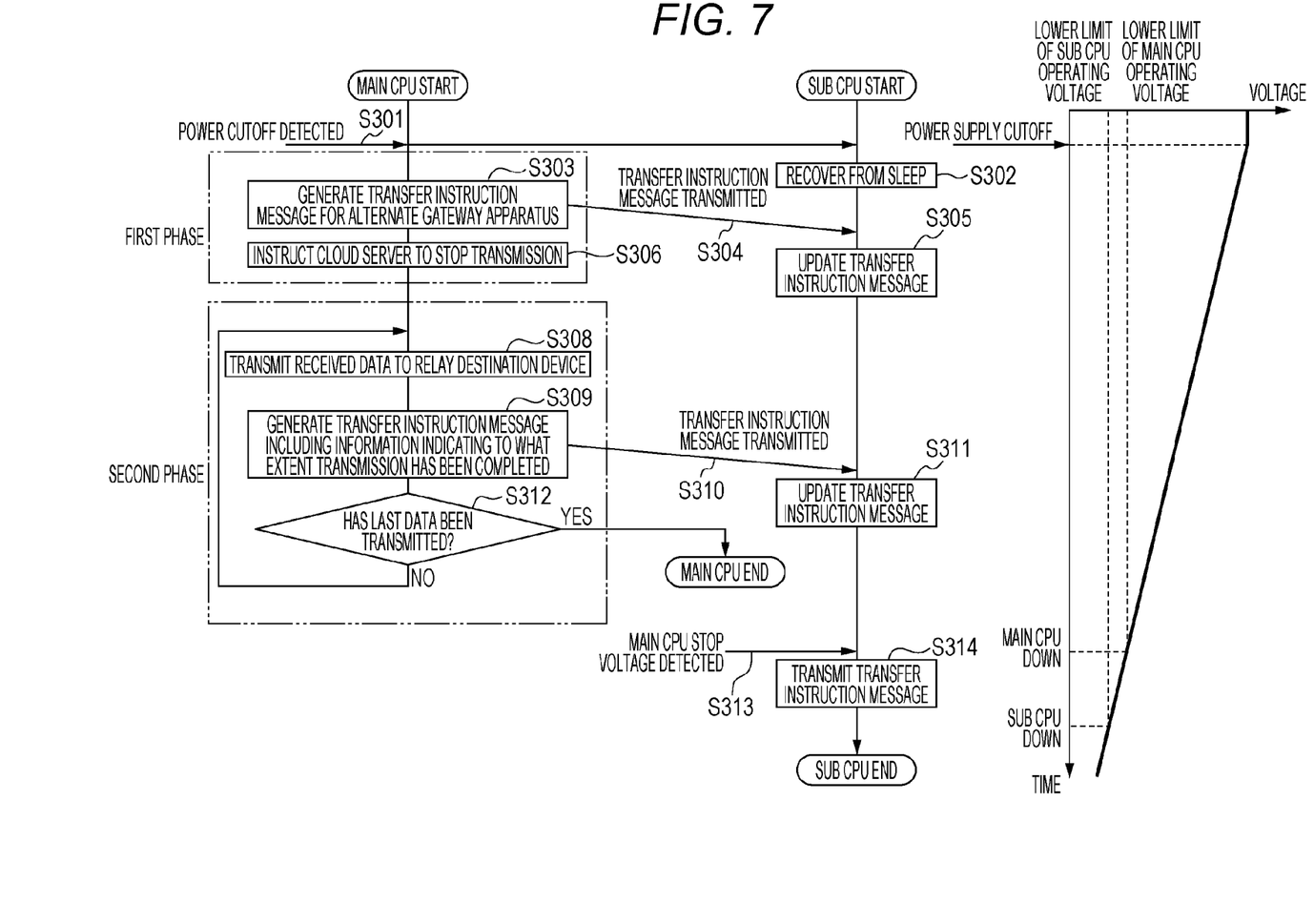
FIG. 7 is a diagram showing an operation to be performed when the primary power supply is cut off in an image forming system according to a modification of this embodiment.

FIG. 7 is a diagram showing an operation to be performed when the primary power supply is cut off in the image forming system 10 according to a modification of this embodiment.

FIG. 7 schematically shows the operation of the main CPU 111, the operation of the sub CPU 113, and the variation of the voltage of the secondary power supply, as in FIG. 5. In the description below, the relay function is transferred to the alternate apparatus 201 while transmission data (an example of the relay data) is being transmitted from the cloud server 60 to the device 501.

In FIG. 7, the operation to be performed by the sub CPU 113 is the same as the operation to be performed by the sub CPU 113 in the above described embodiment. That is, the processing in steps S302, S305, S311, and S314 is the same as the processing in steps S202, S207, S214, and S216.

When a cutoff of the power supply is detected by the primary power supply cutoff managing unit 105 (S301), the main CPU 111 performs a first phase operation.

Specifically, in step S303, the main CPU 111 generates a transfer instruction message to transfer the relay function to the alternate apparatus 201 selected as the transfer destination. At this point, the main CPU 111 generates a transfer instruction message including relayed communication information.

The relayed communication information contains the following information: the IP address of the cloud server 60; information about an HTTP session (communication identification information) transmitted from the gateway apparatus 1 to the cloud server 60; the IP address of the device 501 as the relay destination of the relayed communication; and identification information (an example of information indicating the variation of the state of the gateway apparatus 1) indicating the completion status of the transmission being performed through the relayed communication (or indicating to what extent the transmission of the transmission data has been completed).

In step S304, the main CPU 111 transmits the generated transfer instruction message to the sub CPU 113. As a result, the transfer instruction message is held in the sub CPU 113 (S305).

In step S306, the main CPU 111 instructs the cloud server 60 to stop data transmission to the device 501 and the like (a transmission stop instruction). As a result, the data transmission from the cloud server 60 is stopped.

The main CPU 111 next performs a second phase operation. Unless the voltage of the secondary power supply drops to the lower limit of the operation-guarantee voltage of the main CPU 111, the second phase operation is continued until the transmission of the information being transmitted is completed.

Specifically, in step S308, the main CPU 111 transmits the transmission data already received from the cloud server 60 to the device 501 that is the relay destination.

In step S309, a transfer instruction message to which identification information indicating the completion status of the transmission of the transmission data at this point is added is generated.

In step S310, the main CPU 111 transmits the generated transfer instruction message to the sub CPU 113. As a result, the transfer instruction message held in the sub CPU 113 is updated (S311).

In step S312, the main CPU 111 determines whether the last data of the transmission data already received from the cloud server 60 has been transmitted to the device 501. If the last data has been transmitted, the main CPU 111 ends the operation. If the last data has not been transmitted yet, on the other hand, the main CPU 111 repeats the processing in steps S308 and S309 until determining that the last data has been transmitted.

Here, the voltage of the secondary power supply is assumed to have dropped to the lower limit of the operation-guarantee voltage of the main CPU 111 in step S313. At this point, the secondary power supply voltage managing unit 107 detects the drop of the voltage of the secondary power supply to the lower limit of the operation-guarantee voltage, and the operation of the main CPU 111 comes to an end. After the secondary power supply voltage managing unit 107 detects the voltage drop, the sub CPU 113 in step S314 transmits the transfer instruction message in the same manner as in step S216. The sub CPU 113 transmits the transfer instruction message last generated or updated at that point, to the alternate apparatus 201 as the transfer destination. After the transmission, the operation of the sub CPU 113 comes to an end.

After the transfer instruction message is transmitted to the alternate apparatus 201 in the above manner, the alternate apparatus 201 performs the relay function in accordance with the received transfer instruction message. From the identification information included in the transfer instruction message, the alternate apparatus 201 can determine whether some of the transmission data that has been transmitted from the cloud server 60 and has already been received by the gateway apparatus 1 has not yet been transmitted to the device 501. If there is any data that has not yet been transmitted to the device 501, the alternate apparatus 201 sends a retransmission instruction to the cloud server 60 with respect to the transmission data, so that the communication relay between the cloud server 60 and the device 501 can be continued.

Figure 8:
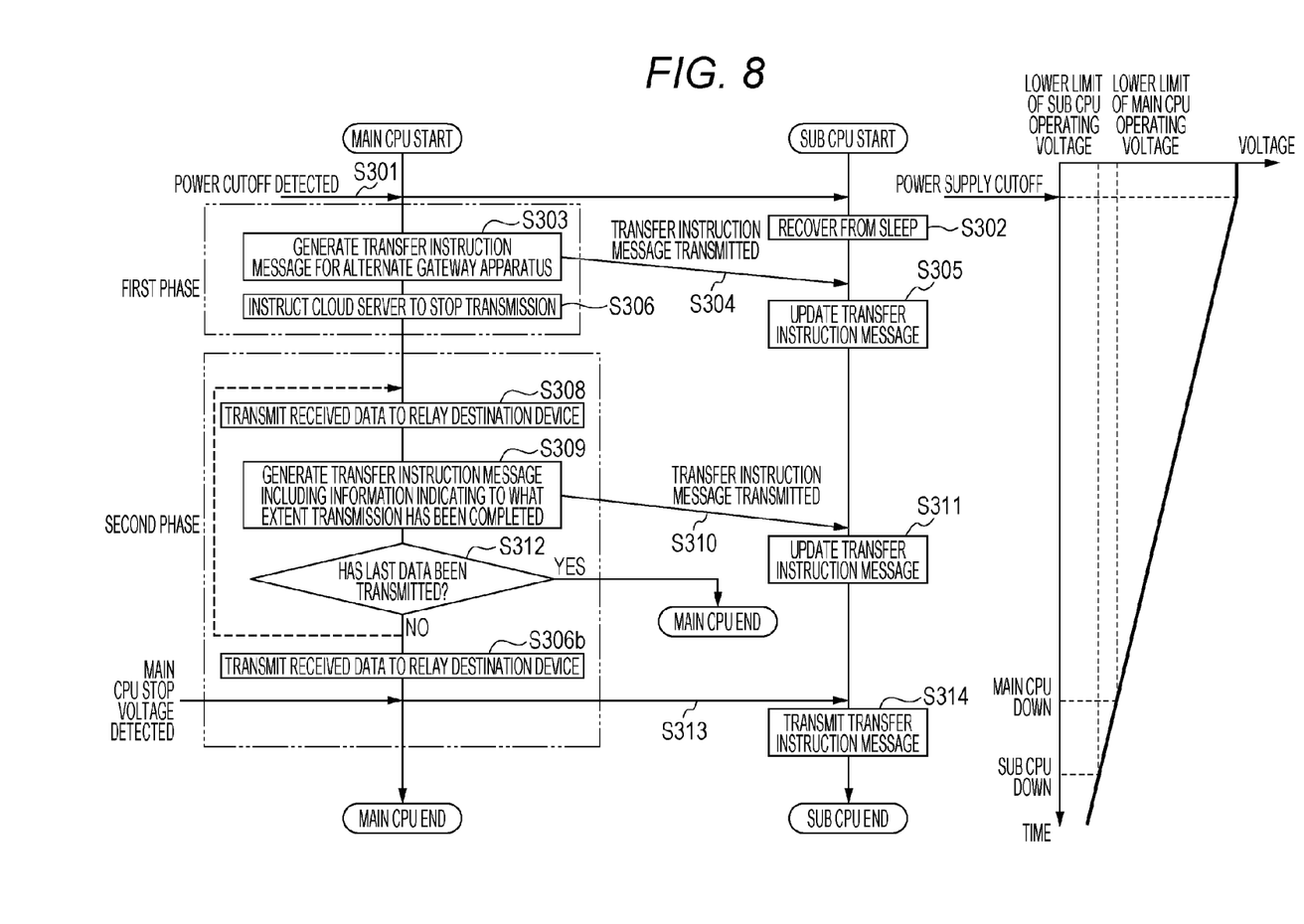
FIG. 8 is a diagram for explaining another example of a relay function transfer operation.

FIG. 8 is a diagram for explaining another example of the relay function transfer operation.

FIG. 8 shows an example case where the voltage of the secondary power supply drops to the lower limit of the operation-guarantee voltage of the main CPU 111 during the second phase operation. The processing in steps S301 to S314 in FIG. 8 is the same as the corresponding processing in FIG. 7.

In step S309 in FIG. 8, a transfer instruction message for update is generated by the main CPU 111. In step S310, the transfer instruction message is transmitted to the sub CPU 113. In step S306b, the transmission data already received is further transmitted to the device 501. In step S313, if the secondary power supply voltage managing unit 107 detects a drop of the voltage of the secondary power supply to the lower limit of the operation-guarantee voltage of the main CPU 111 at this point, for example, the sub CPU 113 transmits the transfer instruction message. The transfer instruction message to be transmitted from the sub CPU 113 at this point does not reflect the identification information about the transmission data after the transmission in step S306b. The alternate apparatus 201 that has received the transfer instruction message can resume the relay, starting from the transmission data transmitted in step S306b.

As described above, in this modification, while the voltage of the secondary power supply is maintained at such a voltage that the main CPU 111 can operate, the main CPU 111 repeatedly transmits transmission data and updates the transfer instruction message including the identification information about the transmission data, until all the transmission data that has been transmitted from the cloud server 60 and has already been received by the gateway apparatus 1 is transmitted to the device 501. Accordingly, the relay function can be transferred to the alternate apparatus 201, after the largest possible amount of transmission data is relayed.

If the voltage of the secondary power supply drops to the lower limit of the operation-guarantee voltage of the main CPU 111, on the other hand, the sub CPU 113 that can operate at a lower voltage than the main CPU 111 transmits the transfer instruction message to the alternate apparatus 201. Accordingly, the transfer instruction message can be transmitted without fail, after the largest possible amount of transmission data is transmitted by the main CPU 111.

Other Aspects

The image forming system is not limited to a system using a cloud server and the like, and may be a system that performs communication between a server and a device via a gateway apparatus in a client server system having a relatively simple configuration, or a system in which terminals communicate with each other via a gateway apparatus in a peer-to-peer network, for example. In such cases, if the gateway apparatus is made to function in the same manner as described above, the same effects as those described above can be achieved.

The hardware structures of the respective apparatuses constituting the image forming system are not limited to those described above. The respective apparatuses may be MFPs, for example, or may be computers or apparatuses to be used mainly for other purposes that involve computers.

The devices may be monochrome/color copying machines, printers, facsimile machines, or multi-function peripherals (MFPs) having the functions of those machines. The devices are not limited to devices that form images by electrophotography, but may be devices that form images by a so-called ink jet technology. The devices to be used in the image forming system in the present invention are not limited to image forming apparatuses. For example, the devices may be image processing devices that are used in various apparatuses, such as scanner devices that read image data, imaging devices, image data transmission/reception devices.

The main CPU 111 may acquire information about the state of an apparatus located in the vicinity of the gateway apparatus, such as the apparatus having the second highest transfer priority, instead of the state of the apparatus selected as the transfer destination at that point.

The processing in the above described embodiment may be performed by software, or may be performed with a hardware circuit.

A program for performing the processing in the above described embodiment can be provided, or the program may be recorded on a recording medium such as a CD-ROM, a flexible disk, a hard disk, a ROM, a RAM, or a memory card, and be provided to a user. The program may be downloaded into an apparatus via a communication network such as the Internet. The processing explained above with the flowcharts and text is performed by a CPU or the like in accordance with the program.

According to an embodiment of the present invention, after the main CPU generates a transfer instruction message, the main CPU updates the transfer instruction message based on a change in the state of the gateway apparatus or an apparatus located in the vicinity of the gateway apparatus and, in accordance with a result of detection of the operating voltage of the main CPU or the voltage corresponding to the operating voltage, the sub CPU transmits the transfer instruction message to an alternate apparatus. Accordingly, it is possible to provide a gateway apparatus that has a high possibility of succeeding in transferring a function to an alternate apparatus when the primary power supply is cut off.

Although the present invention has been described and illustrated in detail, it is clearly understood that the same is by way of illustrated and example only and is not to be taken by way of limitation, the scope of the present invention being interpreted by terms of the appended claims. It should be understood that equivalents of the claimed inventions and all modifications thereof are incorporated herein.

What is claimed is:

1. A gateway apparatus connected to an image processing apparatus in a communicable manner and connected to an external apparatus via a network, the gateway apparatus performing communication control between the image processing apparatus and the external apparatus,
    the gateway apparatus comprising:
        a main CPU configured to perform the communication control;
        a sub CPU configured to be capable of operating at a lower voltage than the main CPU;
        a first detecting unit configured to detect a state of a primary power supply;
        a second detecting unit configured to detect a state of a secondary power supply;
        a generating unit configured to, under the control of the main CPU, generate a transfer instruction message in accordance with a result of the detection performed by the first detecting unit;
        an acquiring unit configured to, under the control of the main CPU, acquire information about a change in a state of the gateway apparatus or an apparatus located in the vicinity of the gateway apparatus;
        an updating unit configured to, under the control of the main CPU, repeatedly perform updating of the transfer instruction message generated by the generating unit in accordance with the information acquired by the acquiring unit, after the generation of the transfer instruction message; and
        a transmitting unit configured to, under the control of the sub CPU, transmit the last-generated or last-updated transfer instruction message to an external alternate apparatus having a function to perform the communication control, in accordance with a result of the detection performed by the second detecting unit.

2. The gateway apparatus according to claim 1, wherein
    the first detecting unit determines whether the primary power supply for the gateway apparatus has been cut off, and
    the generating unit starts generating the transfer instruction message after the primary power supply for the gateway apparatus is cut off.

3. The gateway apparatus according to claim 1, wherein
    the second detecting unit determines whether a voltage of the secondary power supply has dropped to a lower limit of an operation-guarantee voltage of the main CPU, and,
    after the voltage of the secondary power supply has dropped to the lower limit of the operation-guarantee voltage of the main CPU, the transmitting unit transmits the transfer instruction message at that point.

4. The gateway apparatus according to claim 1, wherein
the acquiring unit acquires information about a state of the alternate apparatus, and
the updating unit repeats the updating in accordance with the information about the state of the alternate apparatus.

5. The gateway apparatus according to claim 1, further comprising
a selecting unit configured to, under the control of the main CPU, select one alternate apparatus from among a plurality of apparatuses each being able to serve as the alternate apparatus,
wherein
the generating unit generates the transfer instruction message so as to cope with the alternate apparatus selected by the selecting unit not based on a state of any of the plurality of apparatuses, and
the updating unit updates the transfer instruction message so as to cope with the alternate apparatus selected by the selecting unit based on a state of at least one of the plurality of apparatuses.

6. The gateway apparatus according to claim 1, further comprising
a relaying unit configured to relay communication between the image processing apparatus and the external apparatus,
wherein the communication control is performed by the relaying unit.

7. The gateway apparatus according to claim 6, further comprising:
a constant connection unit configured to be constantly connected to an external management apparatus; and
a receiving unit configured to receive a connection request from the management apparatus,
wherein, in response to the connection request, the relaying unit establishes a session connecting the external apparatus and the image processing apparatus, and relays the communication between the external apparatus and the image processing apparatus.

8. The gateway apparatus according to claim 6, wherein,
when the relaying unit is relaying relay data, the generating unit generates the transfer instruction message including identification information indicating to what extent the relaying of the relay data has been completed, and,
while performing the updating, the updating unit updates the transfer instruction message including the identification information in accordance with a completion status of the relaying of the relay data obtained until then.

9. The gateway apparatus according to claim 1, wherein the sub CPU is activated when the main CPU enters a sleep state, and is activated when the primary power supply is cut off in accordance with a result of the detection performed by the first detecting unit.

10. A method of controlling a gateway apparatus connected to an image processing apparatus in a communicable manner and connected to an external apparatus via a network, the gateway apparatus performing communication control between the image processing apparatus and the external apparatus,
the gateway apparatus including:
a main CPU capable of performing the communication control;
a sub CPU capable of operating at a lower voltage than the main CPU;
a first detecting unit detecting a state of a primary power supply; and
a second detecting unit detecting a state of a secondary power supply;
the method comprising:
a generating step of, under the control of the main CPU, generating a transfer instruction message in accordance with a result of the detection performed by the first detecting unit;
an acquiring step of, under the control of the main CPU, acquiring information about a change in a state of the gateway apparatus or an apparatus located in the vicinity of the gateway apparatus;
an updating step of, under the control of the main CPU, repeatedly performing updating of the transfer instruction message generated in the generating step in accordance with the information acquired in the acquiring step, after the generation of the transfer instruction message; and
a transmitting step of, under the control of the sub CPU, transmitting the last-generated or last-updated transfer instruction message to an external alternate apparatus having a function to perform the communication control, in accordance with a result of the detection performed by the second detecting unit.

11. A non-transitory recording medium storing a computer readable program for controlling a gateway apparatus connected to an image processing apparatus in a communicable manner and connected to an external apparatus via a network, the gateway apparatus performing communication control between the image processing apparatus and the external apparatus,
the gateway apparatus including:
a main CPU capable of performing the communication control;
a sub CPU capable of operating at a lower voltage than the main CPU;
a first detecting unit detecting a state of a primary power supply; and
a second detecting unit detecting a state of a secondary power supply;
the program causing a computer to carry out:
a generating step of, under the control of the main CPU, generating a transfer instruction message in accordance with a result of the detection performed by the first detecting unit;
an acquiring step of, under the control of the main CPU, acquiring information about a change in a state of the gateway apparatus or an apparatus located in the vicinity of the gateway apparatus;
an updating step of, under the control of the main CPU, repeatedly performing updating of the transfer instruction message generated in the generating step in accordance with the information acquired in the acquiring step, after the generation of the transfer instruction message; and
a transmitting step of, under the control of the sub CPU, transmitting the last-generated or last-updated transfer instruction message to an external alternate apparatus having a function to perform the communication control, in accordance with a result of the detection performed by the second detecting unit.

* * * * *